United States Patent
Jordan

[15] 3,691,828
[45] Sept. 19, 1972

[54] FLOW DIRECTION INDICATOR

[72] Inventor: Donald J. Jordan, 113 Evergreen Lane, Glastonbury, Conn. 06033

[22] Filed: Feb. 16, 1971

[21] Appl. No.: 115,578

[52] U.S. Cl..............................73/188, 116/124 A
[51] Int. Cl...............................................G01p 13/02
[58] Field of Search............73/188, 189, 407 R, 409; 116/65, 124 A; 92/48

[56] References Cited

UNITED STATES PATENTS

| | | | |
|---|---|---|---|
| 1,543,061 | 6/1925 | Danelson | 73/407 R X |
| 1,950,107 | 3/1934 | Guinn et al. | 73/410 UX |
| 2,250,734 | 7/1941 | Thompson et al. | 92/48 X |
| 2,689,481 | 9/1954 | Quiat | 73/410 X |

*Primary Examiner*—Jerry W. Myracle
*Attorney*—Fishman & Van Kirk

[57] ABSTRACT

Apparatus for sensing and penumatically indicating the direction of flow of a fluid relative to a pre-determined axis. The apparatus comprises a combination of a mechanical device which senses the direction of flow and produces a pressure unbalance commensurate therewith and a pneumatic indicator device including a bellows which moves in response to the pressure unbalance.

4 Claims, 1 Drawing Figure

PATENTED SEP 19 1972
3,691,828
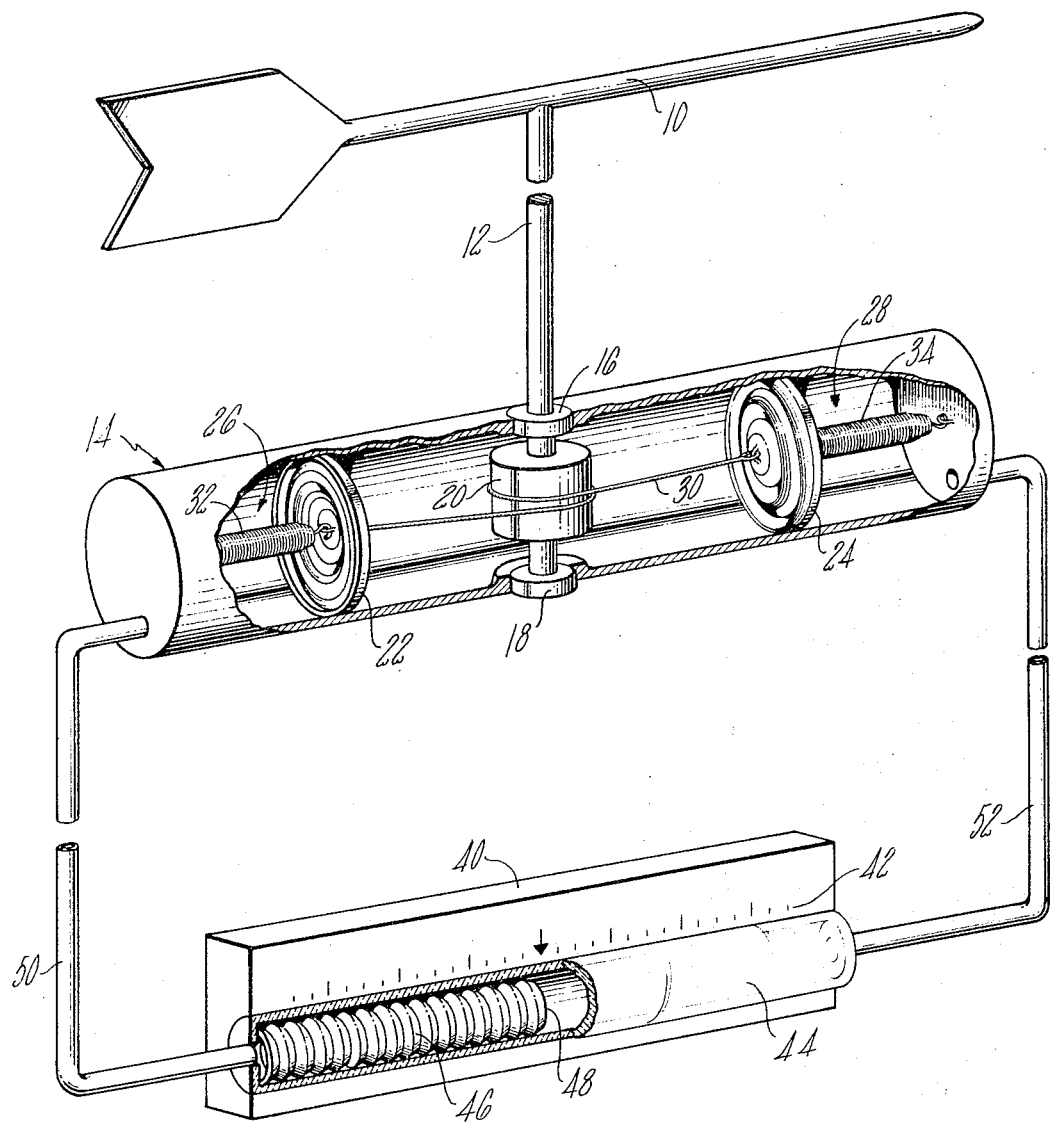
INVENTOR
DONALD J. JORDAN
BY Fishman and Van Kirk
ATTORNEYS 3,691,828

FLOW DIRECTION INDICATOR

BACKGROUND OF THE INVENTION

1. Field of the Invention

The present invention relates to measurement of the direction of flow of a fluid. More particularly, this invention is directed to apparatus for sensing and indicating wind direction relative to a predetermined axis. Accordingly, the general objects of the present invention are to provide novel and improved methods and apparatus of such character.

2. Description of the Prior Art

While not limited thereto in its utility, the present invention has been found to be particularly well suited for employment as a wind direction indicator for use on sailboats. Presently available wind direction indicators are operated electrically and are relatively complicated and expensive devices. The prior art electrical wind direction indicator systems are exemplified by the apparatus disclosed in U.S. Pat. No. 2,363,087 to G. F. Salisbury and U.S. Pat. No. 3,478,585 to V. E. Scannell.

There has long been a need for an inexpensive and reliable wind direction indicator which is capable of use even on small boats. For maximum reliability, there has also long been a need for non-electrical transmitting units for converting movements of a remotely located sensor, such as a wind vane, to a readily discernible indication.

SUMMARY OF THE INVENTION

The present invention overcomes the above, briefly discussed and other disadvantages of the prior art by providing a novel and improved apparatus which is durable, accurate, uncomplicated and inexpensive. In accordance with the invention, the movements of a remotely located sensor are transmitted pneumatically to a novel indicator mechanism.

When utilized as a wind direction indicator, the present invention comprises a wind vane mounted at an exposed location which would typically be the top of the mast of a sailboat. The invention also comprises an indicator located in the vessel cockpit in view of the helmsman. A pneumatic system is employed to transmit signals commensurate with movements of the wind vane to the cockpit mounted indicator. The pneumatic system comprises a housing which is divided into two airtight chambers by means of a pair of flexible diaphragms. The diaphragms are mechanically interconnected and are coupled to the wind vane whereby movement of the vane will cause deflection of the diaphragms. The airtight chambers in the housing are pneumatically coupled to a transparent tube having a bellows mounted therein. One of the chambers is directly coupled to the interior of the bellows while the other of the chambers is coupled to the interior of the tube exterior of the bellows. Deflection of the diaphragms in response to movements of the vane causes the bellows to expand or contract. Accordingly, the position of the bellows within the transparent tube provides an accurate indication of the position of the vane. A calibrated gauge may be defined by mounting the transparent tube on or against a suitable scale.

BRIEF DESCRIPTION OF THE DRAWING

The present invention may be better understood and its numerous objects and advantages will become apparent to those skilled in the art by reference to the accompanying drawing which is a perspective view, partly in section, of a preferred embodiment of the present invention employed as a wind direction indicator.

DESCRIPTION OF THE PREFERRED EMBODIMENT

When employed as a wind direction indicator for use on a sailboat, the present invention will comprise a wind vane 10 mounted in a suitable location so as to be exposed to the wind at all times. Vane 10 thus would typically be mounted at the top of the main mast. Vane 10 is rigidly attached to a shaft 12. Shaft 12 is, in turn, supported in a housing 14 by bearings 16 and 18. A spool or drum 20 is mounted on shaft 12 and within housing 14. Spool 20 will be keyed or otherwise rigidly attached to shaft 12 and thus spool 20 will turn when wind pressure on vane 10 causes shaft 12 to rotate in bearings 16 and 18.

A pair of diaphragms 22 and 24 are mounted within housing 14 at either side of spool 20. Diaphragms 22 and 24 will typically be comprised of a flexible plastic material or rubber. The diaphragms will be airtight and will be sealed about their peripheries to the interior walls of housing 14. Accordingly, diaphragms 22 and 24 in part define sealed chambers, indicated generally at 26 and 28, at either end of housing 14.

A flexible cord or belt 30 is attached to the center of each of diaphragms 22 and 24 at the sides facing spool 20. Belt 30 is wound around spool 20 in such a manner that rotation of the spool will cause the diaphragms to be deflected in opposite directions. Tension is maintained on belt 30 via a pair of springs 32 and 34. Springs 32 and 34 are disposed within airtight chambers 26 and 28 of housing 14 and extend between the centers of diaphragms 22 and 24 respectively and the end walls of housing 14.

The gauge or indicator portion of the disclosed embodiment of the present invention comprises a support member 40 which has a suitable scale 42 imprinted or otherwise affixed thereto. Means 44 defining a transparent tube is mounted either in or on support 40. Thus, accordingly, support 40 may comprise merely a board having a scale imprinted thereon while tube 44 may comprise a clear glass or plastic tube affixed to the member 40 directly beneath scale 42 by means of a suitable adhesive. Alternately, member 40 may be etched to form a groove which receives tube 44 or support 40 may be molded so as to include tube 44 as an integral component.

A thin very flexible plastic or rubber bellows 46 is positioned within tube 44. Bellows 46 extends from a first end of tube 44 towards the middle of the tube and the free end 48 of the bellows functions, in the manner to be described below, as a meter dial. A first conduit 50 extends into the first end of tube 44 and communicates with the interior of bellows 46. Airtight connections are made where conduit 50 extends through the end wall of tube 44 and also between the conduit 50 and the bellows 46. The other end of conduit 50 is in communication, also via an airtight connection, with the interior of chamber 26 in housing 14. The second end of transparent tube 44 is placed in communication with the interior of chamber 28 of housing 14 via a conduit 52; there being airtight connections between the ends of conduit 52 and housing 14 and the second end of tube 44. Accordingly, the interior of tube 44 is in direct fluid communication with the interior of chamber 28 and the interior of flexible bellows 46 is in direct fluid communication with the interior of chamber 26.

In the installed position, again considering the present invention in the environment of a wind direction indicator for a sailboat, the vane 10 will be aligned with the axis of the vessel before being exposed to the wind. Under these conditions neither of diaphragms 22 or 24 will be deflected and the end 48 of bellows 46 will be at the middle of scale 42 on support 40. When vane 10 is exposed to the wind, the vane will turn whereby shaft 12 will rotate in bearings 16 and 18. Rotation of shaft 12 will cause the rotation of spool 20 and the rotational movement of spool 20 will be transmitted to diaphragms 22 and 24 via belt 30. Due to the combined action of belt 30 and springs 32 and 34, movement of spool 20 will result in deflection of diaphragms 22 and 24 in opposite directions. Deflection of the diaphragms will change the volume of cavities 26 and 28 and will thus force air into one of conduits 50 and 52 and out of the other conduit. Airflow into or out of conduits 50 and 52 will cause the bellows 46 to expand or contract thereby changing the position of the end 48 of bellows 46 with respect to the midpoint of scale 42. Accordingly, rotation of the wind vane 10 causes motion of bellows 46 and the position of the bellows indicates the direction of the wind; the wind direction being read off scale 42.

While a preferred embodiment has been shown and described, numerous modifications and substitutions may be made thereto without departing from the spirit and scope of the present invention. Accordingly, it is to be understood that the present invention has been described by way of illustration and not limitation.

What is claimed is:

1. A flow direction sensor comprising:
    movable means adapted to be exposed to a fluid;
    transmitter means, said transmitter means including a housing and at least a first flexible diaphragm mounted in said housing and cooperating with the walls thereof to define a first closed chamber in said housing at one side of said first diaphragm, said first chamber being isolated from the ambient atmosphere;
    means transmitting the motion of said movable means into said housing to said first flexible diaphragm, movements of said movable means deflecting said first diaphragm and causing variations in the volume of said first chamber;
    indicator means, said indicator means adapted to be positioned remotely of said transmitter means, said indicator means including an outer closed tubular member which is at least in part transparent, said indicator means further including bellows means positioned inside of said tubular member, the interior of said bellows means being isolated from the interior of said tubular member, said bellows means being affixed at a first end to one end of said tubular member, the second end of said bellows means being movable longitudinally of said tubular member transparent part to provide an indication;
    first conduit means sealably coupling the interior of said indicator means bellows means to the interior of said transmitter means first chamber; and
    second conduit means coupling the interior of said indicator means tubular member to the interior of said transmitter means housing at the other side of said first diaphragm.

2. The apparatus of claim 1 wherein said transmitter means further comprises:
    a second flexible diaphragm mounted in said housing and cooperating with the walls thereof to define a second closed chamber in said housing at one side of said second diaphragm, said second chamber being spacially displaced from said first chamber and isolated from the ambient atmosphere, said second conduit means communicating with the interior of said second chamber and said motion transmitting means being coupled to said second diaphragm whereby said first and second diaphragms will be deflected simultaneously.

3. The apparatus of claim 2 wherein said motion transmitting means comprises:
    rotatable shaft means coupled at one end to said movable means, said rotatable shaft means extending into said housing at a point intermediate said first and second flexible diaphragms; and
    means coupling said shaft means to said diaphragms, said coupling means causing deflection of said diaphragms in opposite directions upon rotation of said shaft means.

4. The apparatus of claim 3 further comprising:
    tensioning means for biasing said diaphragms against said coupling means.

* * * * *